United States Patent [19]

Gupta

[11] Patent Number: 5,140,822
[45] Date of Patent: Aug. 25, 1992

[54] METHOD AND APPARATUS FOR CHILLING AND CARBONATING A LIQUID USING LIQUID CARBON DIOXIDE

[75] Inventor: Ashis S. Gupta, Marietta, Ga.

[73] Assignee: The Coca-Cola Company, Atlanta, Ga.

[21] Appl. No.: 652,712

[22] Filed: Feb. 8, 1991

[51] Int. Cl.$^5$ .............................................. F17C 7/02
[52] U.S. Cl. ....................................... 62/50.1; 62/70; 62/384; 261/DIG. 7
[58] Field of Search ............ 62/121, 68, 69, 70, 62/384, 388, 50.1, 50.2; 222/129.1, 146.6; 261/DIG. 7

[56] References Cited

U.S. PATENT DOCUMENTS

| | | | |
|---|---|---|---|
| 3,240,395 | 3/1966 | Carver | 222/129.1 |
| 3,367,136 | 2/1968 | Bottani | 62/384 |
| 3,661,483 | 5/1972 | Bose | 62/384 |
| 3,672,182 | 6/1972 | Stowasser et al. | 62/121 |
| 3,832,474 | 8/1974 | Karr | 426/477 |
| 4,022,119 | 5/1977 | Karr | 99/275 |
| 4,068,010 | 1/1978 | Karr | 426/477 |
| 4,972,677 | 11/1990 | Moriya et al. | 62/384 |

Primary Examiner—Ronald C. Capossela
Attorney, Agent, or Firm—Birch, Stewart, Kolasch and Birch

[57] ABSTRACT

An apparatus for chilling and carbonating a liquid comprising a source of carbon dioxide disposed in a container the carbon dioxide in a container being capable of existing in both a liquid and gaseous state, the gaseous state above the liquid state. The container has an outlet opening in the top thereof and a dip tube is disposed in a container for selectively accommodating the flow of liquid carbon dioxide from the bottom of the container through the outlet opening. A tank is provided for holding a supply of liquid to be carbonated and a conduit connects the outlet opening of a container to the inlet opening of the tank. An orifice is provided in the conduit for creating a pressure drop to assure that all carbon dioxide flowing through the conduit is in liquid form and is injected in liquid form into the tank to thereby vaporize the injected liquid carbon dioxide and agitate, carbonate and chill the liquid in the tank. Suitable vents are provided in the tank for releasing carbon dioxide gas caused by the vaporization of liquid carbon dioxide wihch exceeds a predetermined pressure.

3 Claims, 2 Drawing Sheets

METHOD AND APPARATUS FOR CHILLING AND CARBONATING A LIQUID USING LIQUID CARBON DIOXIDE

BACKGROUND OF THE INVENTION

The present invention relates to a method and apparatus for chilling and carbonating a liquid utilizing liquid carbon dioxide. More specifically, the present invention relates to a method and apparatus for chilling and carbonating a liquid for the preparation of a beverage such as a soft drink in environments having high ambient temperatures on the order of 100° to 130° F. such as in the desert.

In the high ambient temperatures experienced in the desert on the order of 100° to 130° F. consumption of liquids is important to prevent dehydration. However, because of the extremely high temperatures it is also important that any beverage consumed is adequately refrigerated or there will be little or no motivation for persons to consume the beverages.

In such a desert environment and particularly at remote locations removed from civilization centers it is hard to keep beverages adequately refrigerated due to inadequate supplies of ice or availability of mechanical refrigeration systems. This is sometimes due to the lack of electrical power at these remote locations which would be utilized to power the machinery which would make and maintain ice supplies, or power conventional mechanical refrigeration systems.

Also if the beverage to be prepared is a soft drink type of beverage, such as in a post-mix beverage dispensing system, conventional electrically powered water and syrup pumps which propel the water and syrup cannot be utilized.

It is not unusual in a desert environment for containers of beverages which are not refrigerated to reach temperatures on the order of 110° F. which clearly is an unpalatable temperature even to the most thirsty of persons.

SUMMARY OF THE INVENTION

Accordingly, it is a primary object of the present invention to provide a method and apparatus for chilling and carbonating beverages in high temperature desert environments.

It is another object of the present invention to provide a method and apparatus for chilling beverages in high temperature environments without use of electrical power.

It is a further object of the present invention to provide a post-mix beverage dispenser for use in any environment where electrical power is lacking and particularly in environments where normal temperatures are as high as 110° to 130° F.

It is yet another object of the present invention to provide a portable beverage dispensing system which may be readily transported to remote locations in the desert or the like.

The objects of the present invention are fulfilled by providing a method of chilling and carbonating a liquid comprising the steps of: providing a source of liquid carbon dioxide ($CO_2$) in a container, the temperature of the container and liquid $CO_2$ therein being unregulated so that it stabilizes near ambient temperature over prolonged storage times; providing a supply of liquid to be chilled and carbonated; rapidly reducing the pressure in said containers so that any $CO_2$ gas therein vaporized by said near ambient temperatures converts said gas back to liquid $CO_2$ by an adiabatic expansion; and injecting the liquid $CO_2$ from the container into the supply of liquid to thereby vaporize the injected liquid $CO_2$ and agitate, carbonate and chill the liquid.

The liquid to be carbonated may be still water alone or a mixture of still water and flavor concentrate.

In a first embodiment of the present invention there is provided an apparatus for chilling and carbonating a liquid comprising: a source of carbon dioxide ($CO_2$) disposed in a container, said $CO_2$ being capable of existing in both a liquid or a gaseous state, liquid $CO_2$ being disposed in the bottom of the container and gaseous $CO_2$ thereabove, said container having an outlet opening in the top thereof; a dip tube disposed in said container for selectively accommodating the flow of liquid $CO_2$ from the bottom of the container through said outlet opening; a tank for holding a supply of liquid to be carbonated; conduit means for accommodating the flow of liquid $CO_2$ from the outlet opening in said container to an inlet opening of said tanks; means connected to said conduit means for injecting liquid $CO_2$ into said tank to thereby vaporize the injected liquid $CO_2$ and agitate, carbonate and chill the liquid in the tank; and vent means in the tank for releasing $CO_2$ gas caused by the vaporization of liquid $CO_2$ which exceeds a predetermined pressure.

The tank in the first embodiment may be a FIGAL container well known in the soft drink industry and the container for the $CO_2$ may be a conventional $CO_2$ cylinder, but with a dip tube therein, which selectively dispenses the liquid $CO_2$ within the cylinder from the bottom thereof.

The means for injecting preferably includes a coiled tube having an inlet end connected to the conduit means near a top wall of the FIGAL tank and an outlet end disposed near a bottom wall of the tank, whereby liquid $CO_2$ flowing through the coiled tube chills the liquid in a tank surrounding the coil.

In a second embodiment the apparatus may include a post-mix type of beverage dispensing system comprising: a source of liquid carbon dioxide ($CO_2$); a supply of liquid to be chilled and carbonated, said supply of liquid including a first tank containing water in fluid communication with said source of liquid $CO_2$; a second tank containing flavor concentrate, said second tank having an outlet conduit for accommodating the flow of flavor concentrate therethrough, said outlet conduit passing through the water in the first tank in heat transfer relationship therewith on en route to a mixing station; a water outlet conduit for said first tank for accommodating the flow of carbonated water to said mixing station; and means for injecting the liquid $CO_2$ into the supply of liquid to thereby vaporize the liquid $CO_2$, agitate, carbonate, and chill the liquid.

The apparatus of the second embodiment further comprises valve means for initiating or stopping the flow of liquid $CO_2$ to said first tank, and temperature sensor means for sensing the temperature of water in said first tank and opening said valve means to initiate the flow of liquid $CO_2$ to said first tank when the water temperature therein exceeds a predetermined value.

The first gas conduit is connected to a gaseous head space in the first tank, and to within the second tank, in order to pressurize the second tank for propelling the flavor concentrate therein through the outlet conduit thereof.

Also provided is a gas driven water pump for supplying water to the first tank, and second gas conduit in communication with the gaseous head space of the carbonator and the water pump, for driving the water pump with the $CO_2$ in the head space formed from the evaporation of the liquid $CO_2$. Therefore, the source of liquid $CO_2$ not only is the sole source of refrigeration and carbonation for the post-mix system but the waste $CO_2$ gas evolving from the carbonation process is utilized to drive the water pump and propel the flavor concentrate to the mixing valve of the post-mix system. Accordingly, no electrical power is needed for the post-mix system of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Figure 1:
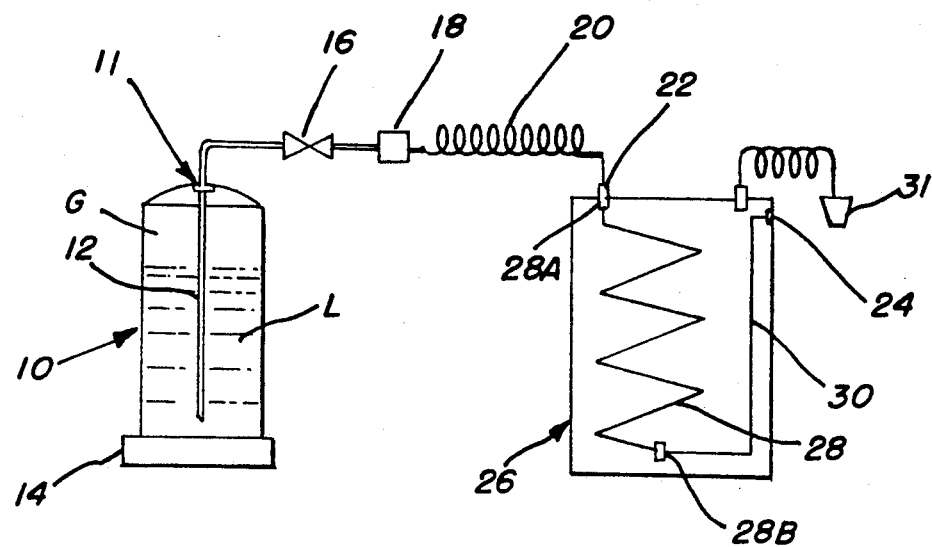
FIG. 1 is a schematic illustration of a beverage chilling and carbonating apparatus in accordance with a first embodiment of the present invention.

Referring to FIG. 1 there is illustrated a $CO_2$ cylinder 10 containing $CO_2$ therein in both the gaseous G and liquid L states. The lighter gaseous state G is dispensed above the liquid state L. However, initially container 10 would be filled almost completely with liquid and there would be very little gaseous head space. However, as the contents of cylinder 10 heat up more and more liquid vaporizes to the gaseous state, and in fact at about 89° F. (31.3° C.) all of the $CO_2$ would be gaseous.

The $CO_2$ cylinder 10 may rest on a stand 14 to help support it on an uneven surface such as sand. A dip tube 12 is provided and extends from an outlet 11 at the top of cylinder 10 to a point near the bottom of the cylinder. This dip tube 12 makes it possible to selectively dispense the liquid $CO_2$, L, from cylinder 10 rather than the gaseous $CO_2$, G, in the head space of the cylinder. Conventional $CO_2$ cylinders do not include the dip tube 12 and therefore gaseous $CO_2$ is dispensed directly out of outlet 11 from the head space.

Coupled to the outlet 11 is a flexible metal hose or conduit 20 which has its other end connected to an inlet coupling 22 on the top of a FIGAL container 26 to be described hereinafter. A valve 16 is provided in conduit 20 adjacent outlet opening 11 to selectively initiate or stop the flow of liquid $CO_2$ from cylinder 10 into conduit 20. A flow regulating device 18 comprising a plate with an orifice of a predetermined size therein is disposed within conduit 20. The size of the orifice is chosen in order to achieve a pressure of 100 to 120 psi at its output side in conduit 20 and a volume flow rate of 25 standard cubic feet per minute. An injector for the liquid $CO_2$ is provided within FIGAL 26 and comprises a coiled steel tube 28 having an end 28A coupled to the input fitting 22 of the FIGAL and a distal end 28B extending into the bottom of the FIGAL. The FIGAL 26 may be filled with water alone or a mixture of water and flavor concentrate. The coil 28 enhances the cooling effect of the liquid $CO_2$ within FIGAL 26 in a manner to be described hereinafter. A dip tube 30 within FIGAL 26 is provided for dispensing the liquid carbonated to a dispensing valve. The carbonated liquid is propelled up dip tube 30 by the internal pressure of the carbonated liquid within the FIGAL tank 26.

Figure 2:
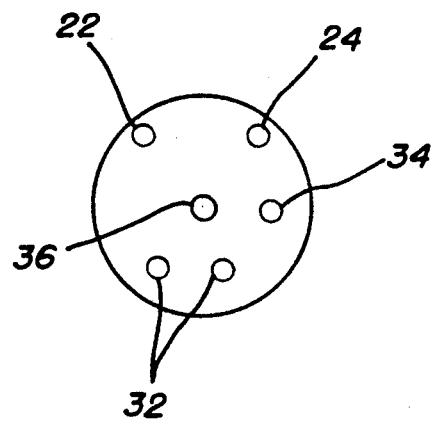
FIG. 2 is a top plan view of a carbonating tank portion of the system of FIG. 1.

In order to achieve proper carbonation levels of the liquid within tank 26 and adequate cooling, a plurality of pressure relief valves are provided in the lid of the tank 26 as illustrated in FIG. 2. Pressure relief valves 32 are provided to release $CO_2$ pressure when the pressure exceeds 80 psi. Pressure relief valve 34 is set to release $CO_2$ pressure above 60 psi so it provides a lower pressure limit of the liquid within the tank 26. An upper pressure relief valve limit is set by relief valve 36 which will open when $CO_2$ pressures reach 120 psi or greater.

The system of FIGS. 1 and 2 will operate in the following manner. Cylinder 10 is initially filled with liquid $CO_2$ which has a temperature of about −56° C. However, when cylinder 10 is stored or transported to an environment with a very high ambient temperature such as experienced in the desert, the temperature of the $CO_2$ within cylinder 10 will gradually rise. As it rises, liquid $CO_2$ will vaporize forming a gaseous phase G disposed above a liquid phase L as illustrated in FIG. 1. When the temperature of the $CO_2$ within cylinder 10 reaches about 89° F. (31.3° C.) all of the $CO_2$ within cylinder 10 becomes gaseous. However, when valve 16 is opened gaseous $CO_2$ will start to flow up dip tube 12 and within about 30 seconds the $CO_2$ within cylinder 10 begins changing to liquid just beyond orifice 18 due to an adiabatic expansion. Liquid $CO_2$ will then flow through conduit 20 into tank 26 through fitting 22 into coil 28. Therefore, liquid $CO_2$ will circulate through coil 28 and out of end 28B thereof into the liquid to be carbonated in the bottom of tank 26. At that point in time liquid $CO_2$ contacting the liquid in tank 26 will vaporize and bubble through the liquid agitating the same and chilling and carbonating the liquid.

As the carbonation process begins the pressure will rise in tank 26 to approximately 108 psi in a very rapid fashion. As it rises of course pressure relief valves 34 will open at 60 psi and valves 32 at 80 psi but the internal pressure will continue to rise to about 108 psi in spite of this venting. Relief valve 36 is also provided in the event that for some unforeseen reason pressure within the tank rises to 120 psi or above. Therefore, valve 36 is a safety release valve. Once carbonation is substantially complete the pressure within tank 26 will drop to between 60 and 80 psi which is a suitable pressure range for dispensing the beverage with a minimum amount of foaming.

In an actual experiment a $CO_2$ cylinder and four (4) gallons of beverage were stored in a FIGAL in a room overnight with a room temperature of 104° F. The beverage in the FIGAL reached a temperature of 108° F. by morning. Liquid $CO_2$ from the cylinder was then fed into the FIGAL. The drop in temperature was then measured with the following results:

| TIME (minutes) | PRODUCT TEMP |
|---|---|
| 0 | 108° F. |
| 1 | 101° F. |
| 2 | 95° F. |
| 3 | 88° F. |
| 4 | 81° F. |
| 5 | 75° F. |
| 6 | 69° F. |

The test was repeated with similar results.

The maximum pressure in the FIGAL ranged from 108-115 psig.

In an alternative embodiment the equipment described in FIGS. 1 and 2 can be used in a remote location at the time of use. This unit can be modified so as to be able to be filled in a central location and carried to the point of consumption and actually consumed several hours later. The product will still be cold after twelve hours.

The modification consists of a rigid circular plastic tube around the FIGAL 26. The diameter of the outer tube is two inches larger than the FIGAL. The space between the FIGAL and the outer tube is filled with a suitable insulating material.

Since the cooling and carbonating will be done at a central location, bulk liquid carbon dioxide can be used instead of premeasured quantity of liquid carbon dioxide in 10. The orifice 18 would be replaced by a regulating valve and a pressure gauge. The pressure inside the FIGAL 26 would be manually adjusted to around 100 psig by opening or closing the regulating valve. The cooling and carbonating time would be manually controlled.

In an actual test water was chilled and carbonated in an insulated dispenser as described above. The dispenser was then placed in a 104° F. room and the temperature rise with time was measured. The temperature of the water rose about 1° F. every hour.

Figure 3:
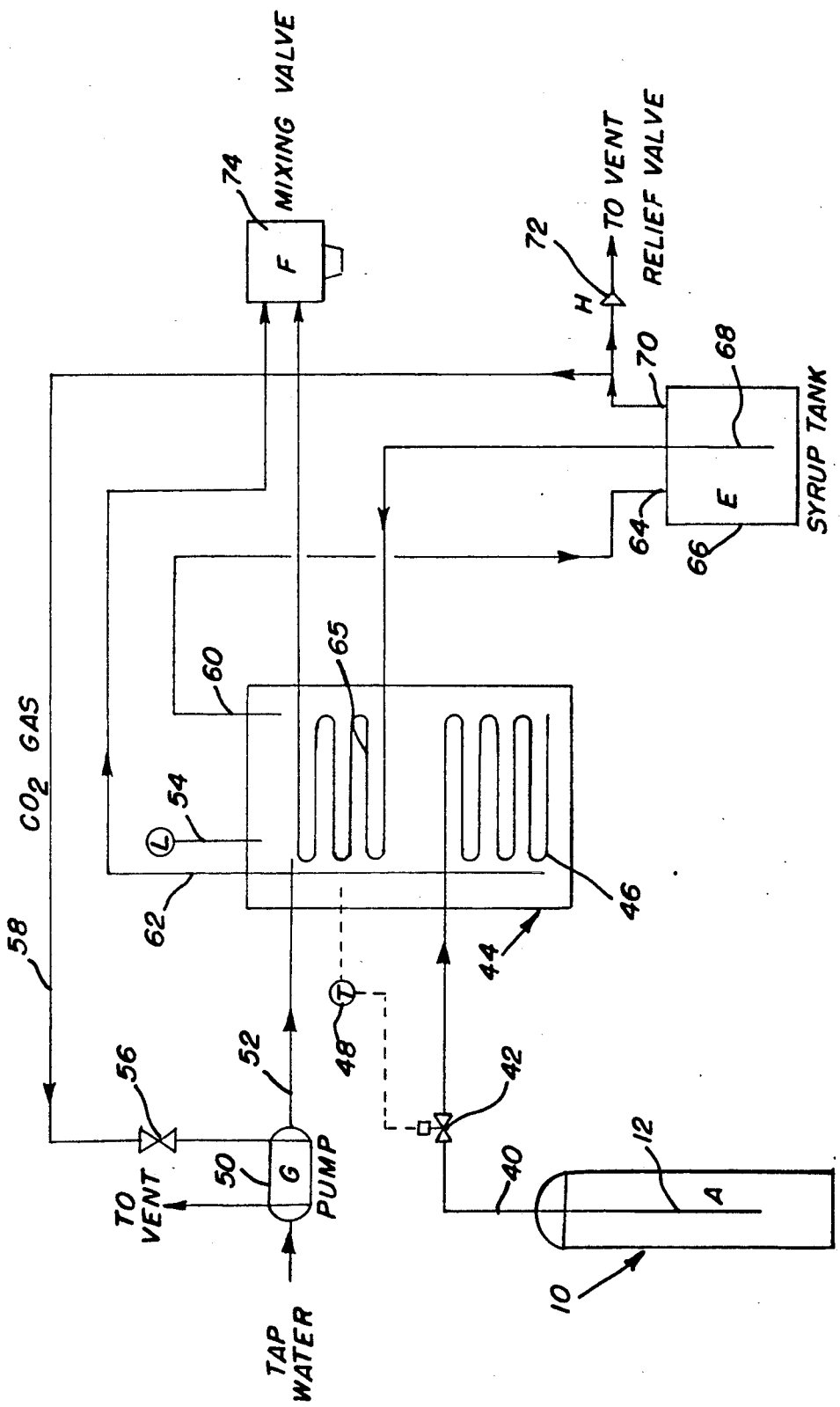
FIG. 3 is a schematic diagram of a post-mix beverage dispenser comprising a second embodiment of the present invention.

A second embodiment of the present invention is illustrated in FIG. 3. This embodiment comprises a post-mix beverage dispenser in which a syrup or flavor concentrate is disposed in syrup tank 66 and a supply of water is contained in a holding tank or carbonator 44. The $CO_2$ cylinder 10 is similar to cylinder 10 of the FIG. 1 embodiment and includes a similar dip tube 12 for selectively withdrawing any liquid $CO_2$ within cylinder 10 and supplying it through a conduit 40 to the carbonator 44. Conduit 40 is connected to a coil 46 within carbonator 44 so that liquid $CO_2$ flowing through coil 46 will refrigerate or chill the water in the carbonator and the liquid $CO_2$ will be injected into the water within carbonator 44 adjacent the bottom of the tank.

A temperature sensor 48 is provided for sensing the temperature of the water within carbonator 44 and opening or closing a valve 42 disposed in conduit 40. A small battery could be provided to perform this function. For example, if the temperature within carbonator 44 drops below a desired limit, temperature sensor 48 will open valve 42 and permit more liquid $CO_2$ to be injected into the bottom of tank 44. Tank 44 includes an outlet conduit 62 for dispensing carbonated water from tank 44 to a mixing valve 74. Syrup tank 66 includes an outlet conduit 68 for dispensing flavor concentrate from tank 66 through a coil 65 in tank 44 en route to mixing valve 74. A conduit 60 connects the gaseous head space and tank 44 to a fitting 64 on the top of tank 66 in order to utilize waste $CO_2$ gas in tank 44 for propelling the flavor concentrate up conduit 68 and out of tank 66. Tank 66 also includes an outlet conduit 70 in communication with a pressure relief valve 72 and a conduit 58 leading to the input of a gas driven pump 50 through a valve 56. Therefore, the $CO_2$ waste gas in the head space of tank 44 can flow through conduit 60, tank 66, conduit 70 and conduit 58 to pump 50 in order to drive the same. Pump 50 is connected to a source of tap water and provides a supply of water to tank 44 through conduit 52 in response to demand signals from a water level sensor 54 extending into tank 44.

In operation valve 42 in conduit 40 is initially open and liquid $CO_2$ flows up dip tube 12 out of cylinder 10 through conduit 40 and the coil 46 into the bottom of tank 44. At this point the liquid $CO_2$ begins to vaporize thereby agitating, chilling and carbonating the water within tank 44 and creating a gaseous $CO_2$ head space in the top of the tank. Waste $CO_2$ gas from this head space flows out of conduit 60 into the top of syrup tank 66 where it pressurizes the syrup within tank 66 and propels syrup up conduit 68 through coil 65 en route to mixing valve 74. Waste $CO_2$ gas is also supplied from the head space of tank 44 through the appropriate conduits to the input of water pump 50 through valve 56 to power pump 50 when liquid level sensor 54 indicates a demand for more water in tank 44. Accordingly, carbonated post-mix beverages are dispensed from mixing valve 74 on demand and the carbonation and water supply functions of the system continue as needed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of chilling and carbonating a liquid comprising the steps of:
   providing a source of liquid carbon dioxide ($CO_2$) in a container, the temperature of the container and liquid $CO_2$ therein being unregulated so that it stabilizes near ambient temperature over prolonged storage times;
   providing a supply of liquid to be chilled and carbonated;
   rapidly reducing the pressure in said container so that any $CO_2$ gas therein vaporized by said near ambient temperatures converts said gas back to liquid $CO_2$ by an adiabatic expansion; and
   injecting the liquid $CO_2$ from the container into the supply of liquid to thereby vaporize the injected liquid $CO_2$, and agitate, carbonate and chill the liquid.

2. The method of claim 1 where said liquid is water.

3. The method of claim 1 wherein said liquid is a mixture of water and a flavor concentrate.

* * * * *